United States Patent
Trifilo et al.

(10) Patent No.: US 11,489,875 B2
(45) Date of Patent: Nov. 1, 2022

(54) DEVICE CONTEXT IN NETWORK SECURITY POLICIES

(71) Applicant: Cisco Technology, Inc., San Jose, CA (US)

(72) Inventors: Antonio Trifilo, Pully (CH); Maria Carpen Amarie, Yverdon-les-Bains (CH); Thomas Vegas, Gland (CH); Anirban Karmakar, Ecublens (CH); Shree N. Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 16/774,950

(22) Filed: Jan. 28, 2020

(65) Prior Publication Data

US 2021/0234899 A1 Jul. 29, 2021

(51) Int. Cl.
*G06F 13/00* (2006.01)
*H04L 9/40* (2022.01)
*H04L 47/70* (2022.01)
*H04L 61/4511* (2022.01)

(52) U.S. Cl.
CPC .............. *H04L 63/20* (2013.01); *H04L 47/82* (2013.01); *H04L 61/4511* (2022.05); *H04L 63/10* (2013.01)

(58) Field of Classification Search
CPC ..... H04L 63/20; H04L 47/82; H04L 61/1511; H04L 63/10; H04L 61/4511; H04L 67/1034; H04L 61/3025
USPC ......... 709/245, 227–229, 224, 223; 726/2–7, 726/26–29
See application file for complete search history.

(56) References Cited

U.S. PATENT DOCUMENTS

| | | | | |
|---|---|---|---|---|
| 8,738,765 | B2* | 5/2014 | Wyatt | H04L 43/0876 709/224 |
| 9,319,292 | B2* | 4/2016 | Wyatt | H04L 63/20 |
| 9,509,661 | B2 | 11/2016 | Ardeli et al. | |
| 9,734,125 | B2 | 8/2017 | Baldry et al. | |
| 9,906,560 | B2* | 2/2018 | Jain | H04L 12/4641 |
| 9,906,561 | B2* | 2/2018 | Jain | H04L 63/08 |
| 9,906,562 | B2* | 2/2018 | Jain | H04L 63/105 |

(Continued)

OTHER PUBLICATIONS

"Route DNS Traffic," dns-traffic [Accessed on Jan. 21, 2020]. Disco DNA Center User Guide, Release 1.3.3.0 First Published: Jan. 17, 2020.

*Primary Examiner* — Kenneth R Coulter
(74) *Attorney, Agent, or Firm* — Patterson + Sheridan, LLP (57) ABSTRACT

The use of device context in applying security policies is provided by receiving a Domain Name Service (DNS) query for a network resource from a user device (UD) at a DNS analysis server, the DNS query including a functional label describing a context of the UD; analyzing the DNS query to determine whether the UD is permitted to access the network resource based on the functional label; and in response to the functional label indicating that the UD is not permitted to access the network resource, transmitting a block page to the UD. The functional label can be added to the DNS query by a Mobile Device Management application on the UD, a router associated with the UD, or an enterprise server. Contexts for previously blocked DNS queries can be aggregated to identify UDs sharing at least one value with the previously blocked DNS queries as security compromised devices.

20 Claims, 5 Drawing Sheets

(56) References Cited

U.S. PATENT DOCUMENTS

| | | | |
|---|---|---|---|
| 10,051,002 B2* | 8/2018 | Jain | H04L 63/20 |
| 10,243,927 B2 | 3/2019 | Holloway et al. | |
| 10,263,958 B2* | 4/2019 | Bremen | G06Q 30/06 |
| 10,277,554 B2 | 4/2019 | Townsend et al. | |
| 10,397,275 B2* | 8/2019 | Jain | H04L 61/256 |
| 2012/0324568 A1* | 12/2012 | Wyatt | G06F 21/51 |
| | | | 726/13 |
| 2014/0089661 A1 | 3/2014 | Mahadik et al. | |
| 2014/0195604 A1* | 7/2014 | Wyatt | H04W 4/60 |
| | | | 709/203 |
| 2016/0072847 A1* | 3/2016 | Bremen | H04L 63/0236 |
| | | | 726/1 |
| 2017/0063794 A1* | 3/2017 | Jain | H04L 63/0272 |
| 2019/0342346 A1* | 11/2019 | Jain | H04L 61/2585 |

* cited by examiner

DEVICE CONTEXT IN NETWORK SECURITY POLICIES

TECHNICAL FIELD

Embodiments presented in this disclosure generally relate to managing network security policies. More particularly, a computing device connected to the network self-reports a location (among other device characteristics) to a network controller, which determines which policies to enforce at least in part based on the location of the computing device.

BACKGROUND

To retrieve a network resource via a Uniform Resource Locator (URL), a computing device may submit a Domain Name Service (DNS) Query (also referred to as a DNS Request) to resolve the domain name of the requested network resource into an Internet Protocol (IP) address. For example, a user wanting to visit the website of example.com sends a DNS query to a DNS server to return the IP address that "example.com" is associated with. This process may be handled recursively based on whether a given device has already visited or served the network resource in question and has cached the IP address for the requested network resource.

Network security policies define whether a computing device connected to the network is permitted or denied access to various webpages or network resources. In some cases, when a user attempts to visit a forbidden webpage or other domain, a router or network controller may send a "block page" to the requesting device to inform the user that the request has been blocked. A network administrator may customize the block page to explain why a given webpage is blocked, and may have several different block pages for different user groups, data domains, subdomains, or classes of domains that are blocked by the security policies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for using device context in security policies that includes receiving a Domain Name Service (DNS) query for a network resource from a user device at a DNS analysis server, the DNS query including a functional label describing a context of the user device; analyzing the DNS query to determine whether the user device is permitted to access the network resource based on the functional label; and in response to the functional label indicating that the user device is not permitted to access the network resource, transmitting a block page to the user device.

One embodiment presented in this disclosure provides a computer readable storage device including instructions that when executed by a processor cause the processor to perform an operation comprising: receiving a Domain Name Service (DNS) query for a network resource from a user device at a DNS analysis server, the DNS query including a functional label describing a context of the user device; analyzing the DNS query to determine whether the user device is permitted to access the network resource based on the functional label; and in response to the functional label indicating that the user device is not permitted to access the network resource, transmitting a block page to the user device.

One embodiment presented in this disclosure provides a method for using device context in security policies that includes: receiving, on a device, a request for a network resource; determining a context of the device based on metadata of the device; appending a functional label that described the context to a DNS query; and transmitting the DNS query to a DNS analysis server.

Example Embodiments

The present disclosure provides improvements in network management and flexibility in applying security policies. Devices connected to a network apply functional labels to Domain Name Server (DNS) queries that identify one or more of: where the device is located, a device type, an access time, operating system and application versioning information, and a user type, which allows a DNS analysis server to determine which security policies to enforce for the device. The DNS analysis server allows for different access policies to be applied at different locations, different times, on different device types, and/or for different user types, and may be included in a local network (e.g., in a wireless controller in the network the device is connected to), in a remote network (e.g., for a network that the device connects to via a local network and a Virtual Private Network (VPN) connection), and/or in a cloud service used in conjunction with a local or remote network.

Figure 1:
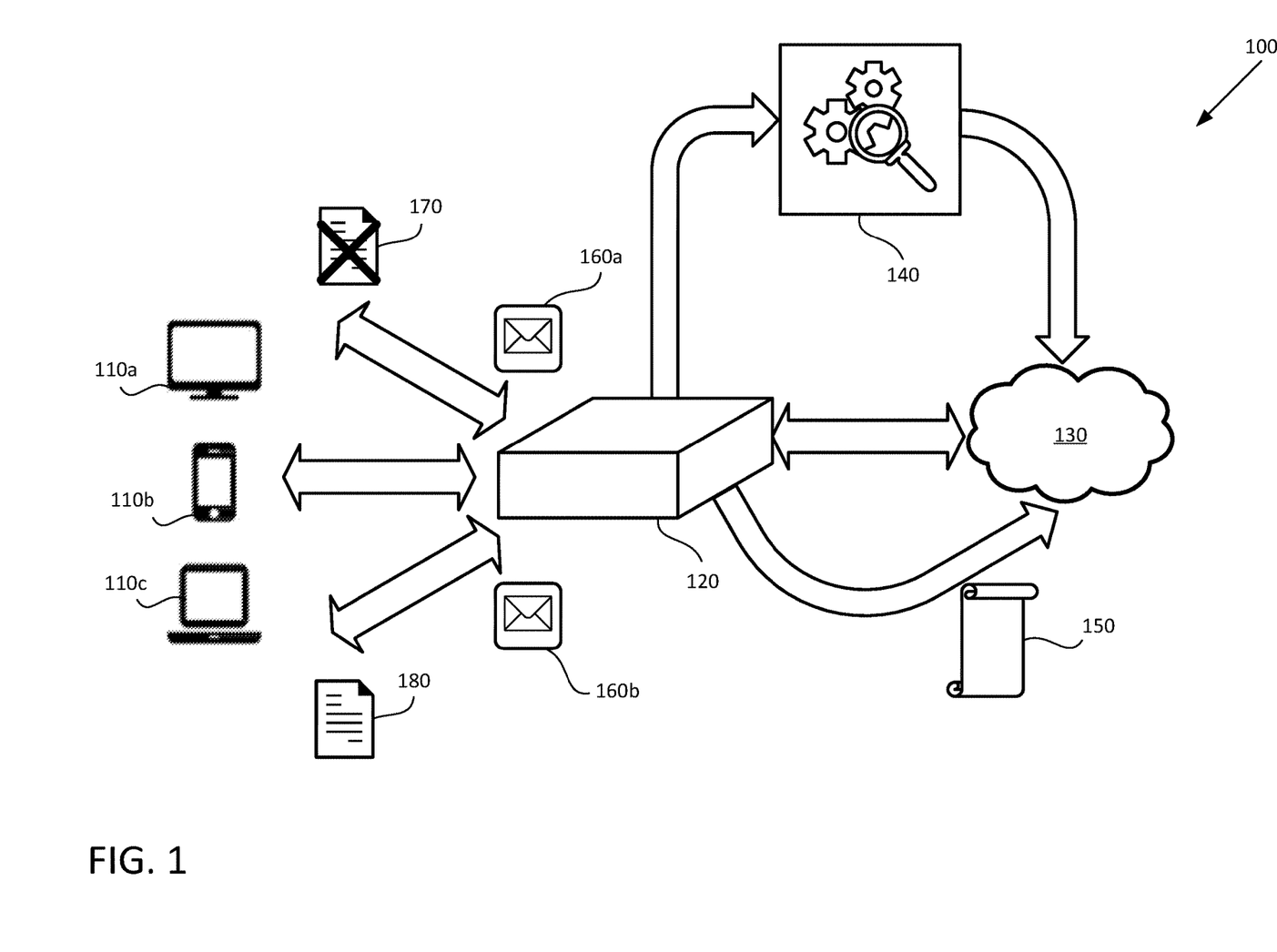
FIG. 1 illustrates an example network processing requests for network resources, according to embodiments of the present disclosure.

FIG. 1 illustrates an example network 100 processing requests for network resources, according to embodiments of the present disclosure. A plurality of user devices 110*a-c* (generally, UD 110) are connected to a router 120. The router 120, in turn, is connected to a DNS analysis server 130, and a policy management server 140.

A UD 110 may include any computing device that is configured to connect to one or more networks. Example UDs 110 can include, but are not limited to: smart phones, feature phones, tablet computers, laptop computers, desktop computers, Internet of Things (IoT) devices, and the like. Example hardware as may be included in a UD 110 is discussed in greater detail in regard to FIG. 5.

A router 120 may include various networking devices configured to provide and/or control access to various wired and/or wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in a router 120 is discussed in greater detail in regard to FIG. 5.

The DNS analysis server 130 and the policy management server 140 include various individual and/or computing devices used to monitor and provide access to requested network resources and enforce policies granting or denying access to those network resources. In various embodiments, the policy management server 140 can be included in the router 120, the DNS analysis server 130, or may be a distinct computing device. Example hardware as may be included in a DNS analysis server 130 or a policy management server 140 is discussed in greater detail in regard to FIG. 5.

During initialization of the network, or during later maintenance of the network, the router 120 (or another network controller via the router 120) provides a policy list 150 to the DNS analysis server 130. In various embodiments, the policy list 150 identifies various features that deny access to given network resources and/or grant access to given network resources, and identifies the interplay between various grants or denials. For example, the policy list 150 may define a hierarchy of how to apply various security policies, which may include various criteria for applying conflicting security policies. For example, if under policy A the network is to block access to example.com, but under policy B the network is to grant access to example.com, the policy list 150 defines when to apply policy A relative to policy B so that the network grants or denies access to example.com as intended by the network administrator.

The UDs 110, when requesting access to a given webpage or other network resource, send a DNS query to the DNS analysis server 130 via the router 120. In various embodiments, a given UD 110 may send messages to various computing devices via the router 120, and select different DNS analysis servers 130 to send DNS queries to. For example, when a user first logs into a hotel's network, the router 120 may forward DNS queries to a DNS analysis server 130 associated with the hotel, but once the user connects to a VPN, the router 120 may forward the DNS queries to a DNS analysis server 130 associated with the VPN (e.g., a DNS analysis server 130 associated with an employer of the user).

In the examples given herein, a first DNS query 160a is for a forbidden resource, and a second DNS query 160b is for a permitted resource. In some embodiment, the UDs 110 and/or the router 120 append various functional labels to the DNS queries that describe various metadata characteristics of the UDs 110 or the software operating thereon, including, but not limited to: details of the account(s) logged into on the UD 110, version information for operating systems and other applications running on the UD 110, a device type of the UD 110, a location of the UD 110, and extrapolations thereof.

Extrapolating metadata offers several benefits over sending raw metadata, which include process shifting (e.g., distributing the computing load among the UDs 110, routers 120, policy management servers 140, and DNS analysis servers 130), policy generalization, and increased messaging efficiency. For example, a DNS query that includes extrapolated metadata for a UD 110 may include a single additional bit (e.g., in an RDATA field) indicating whether each tracked condition in the metadata is true or false (e.g., on/off campus, software up-to-date/out-of-date, user is/is not a member of human resources), which may require fewer bits in the packet(s) comprising the DNS query to represent than the raw data. Additionally, extrapolated metadata allow for faster analysis and/or fewer security policies to review than raw metadata by indicating a category that describes the raw metadata (e.g., a location type, a user type, a time type, a device type, etc.) rather than the specific value for the raw metadata (e.g., Global Positioning System (GPS) coordinates, an account name, a given time, a device identifier, etc.).

The DNS analysis server 130 upon receiving the DNS query, applies the various security policies in the policy list 150 against the metadata contained in the functional labels appended to the DNS query. In one example, the DNS analysis server 130 may first determine whether the UD 110 is in an allowed location before determining whether the user belongs to an allowed user group. In a second example, the DNS analysis server 130 may first determine whether the user belongs to an allowed user group before determining whether the UD 110 is in an allowed location. In a third example, after applying a set of rules determining whether the requested network resource is permitted/denied by the security policies, the DNS analysis server 130 applies an exception list (e.g., user X is denied access to the network resource regardless of other factors or user Y is granted access to the network resource regardless of other factors).

Depending on the determination of whether to grant or deny access to the requested network resource, the DNS analysis server 130 returns a block page 170 and/or access information 180 for the requested network resource (e.g., an IP address) to the router 120. The router 120, in turn, forwards the block page 170 and/or access information 180 to the requesting UD 110.

In various embodiments, the UD 110, the router 120, and/or the policy management server 140 extrapolate the metadata related to the UD 110 to offload computing operations from the DNS analysis server 130 and compress the information for transmission. Accordingly, DNS queries from a first UD 110a located in a first city and from a second UD 110b located in a second city may report the same metadata for device location (e.g., out of office), user type (e.g., field operator), and device type (e.g., mobile) rather than the precise location, user account, and/or device information. These extrapolated metadata are included in the functional labels appended to the DNS queries by the various devices, and provide extrapolated information about the UD 110 to aid in the speed at which the DNS analysis server 130 processes security policies based on the context in which the UD 110 is requesting the network resource. For example, a UD 110 may be able to provide GPS data to finely locate the UD 110, but the location metadata reported may specify an extrapolation of those coordinates indicating whether the UD 110 is located "on campus" or "off campus", is inside/outside of a building, is inside/outside of a given room, etc. Similar extrapolation can be made for the metadata for times (e.g., first shift, weekday, holiday, etc.), user types (e.g., department identifiers, experience levels, security clearances, etc.), device information (e.g., up-to-date software, user-provided vs. employer provided, form factor, etc.).

In embodiments in which the UD 110 self-reports the metadata, a mobile device management (MDM) application executing on the UD 110 classifies the current context of the UD 110 (e.g., extrapolated location, time, user type, device type, etc.) and adds the functional labels to the DNS query. In some embodiments, the MDM application also includes context for generating the request, such as, for example, whether the tasks is made in a given application (e.g., a web browser, an email client, a word processing or spreadsheet application, etc.) and how that task was initiated (e.g., keyboard input, mouse click, automatically by the application).

In some embodiments, the router 120 appends the metadata to a DNS query received from a UD 110, the router 120 may add metadata on behalf of the UD 110 (e.g., adds the context of the UD 110 to the DNS query) and may also add the context of the router 120 to the DNS query separately or in conjunction with self-reporting from the UD 110. For example, the router 120 may be subscribed to a DNS analysis server 130 to allow public access to a network subject to various security policies. The router 120 inspects traffic from the UDs 110 and adds the functional labels to the DNS queries to describe the context in which the DNS query was generated (e.g., from what device type, at what location, from what type of user, using what type of software).

In some embodiments, the policy management server 140 provides metadata for the functional labels to the DNS analysis server 130 to verify the accuracy/integrity of the reported metadata, to provide trend analysis to the DNS analysis server, or to extrapolate the metadata on behalf of the UD 110 and/or router 120. For example, a UD 110 may report locational context via GPS coordinates in the DNS query, which the policy management server 140 can translate into a extrapolated location. In a second example, a UD 110 may report a given value for a first context and the router 120 a different value for that same context, which the policy management server 140 can identify as a falsified or inaccurate context (e.g., either the UD 110 or router 120 is miscalibrated or acting maliciously).

A DNS analysis server 130 can determine, based on the device context and the identity of the requested network resource, whether to grant or deny access to that requested network resource. For example, the DNS analysis server 130 can give one user restricted access when using a personal device when connected to an enterprise network, but offer broader access when that user is using an enterprise-provided device. In a further example, a UD 110 with a user labeled as an employee may be restricted to "guest" level content when located in spaces classified as "public" in the extrapolated metadata, but when that UD 110 moves to a "private" location, the DNS analysis server 130 can grant broader access. In an additional example, the DNS analysis server 130 can use proximity information such as location labels, to detect malware infections in certain areas of an enterprise network, rogue APs playing Man In the Middle Attacks (MITM) by replying with fake DNS Responses to malicious sites, etc. In yet another example, the DNS analysis server 130 can look at the user activity across devices (based on username labels and device type information) to detect behavioral patterns per user and detect a compromised device accessing unwanted malicious webpages.

In various embodiments, the policy management server 140 aggregates DNS queries that are received by the DNS analysis server 130 and analyzes the functional labels for patterns in previous grants or denials of access to the requested network resources. For example, the policy management server 140 may identify clusters of devices with the same values in some or all of the functional labels included in the DNS queries to identify a potential UD 110 engaged in (or attempting to engage in) malicious activities on the network. For example, if several rejected DNS queries are received from UDs 110 in a given location type, connected to a given router 120, with a given user account type, running on a given device type, using a given software type, etc., the policy management server 140 can identify the commonalities in those DNS queries to identify a potential security concern. The policy management server 140 can then identify one or more UDs 110 (and/or routers 120) that are candidates for further inspection as being security compromised devices (e.g., devices infected with malware, in the control of a non-authorized user, in the control of an authorized but malicious user, etc.).

Figure 2:
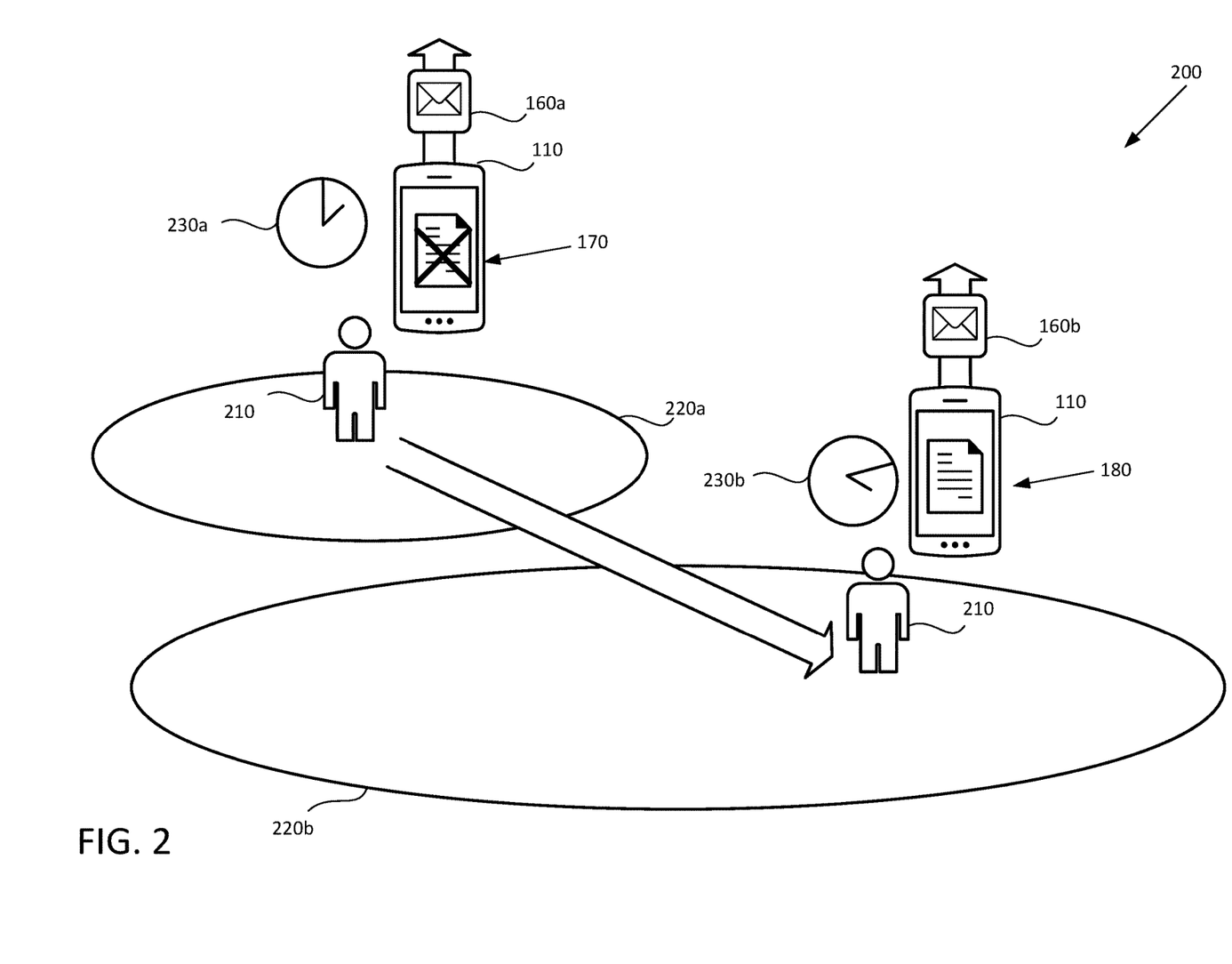
FIG. 2 illustrates an environment in which context dependent security policies are provided, according to embodiments of the present disclosure.

FIG. 2 illustrates an environment 200 in which context dependent security policies are provided, according to embodiments of the present disclosure. In FIG. 2, a UD 110 provides two different outcomes from an otherwise identical DNS query based on having different context information included in the attached functional labels. In various embodiments, the UD 110 may add the functional labels on transmission of the DNS query, and AP to which the UD 110 is connected can add the functional labels on forwarding to the DNS analysis server 130, which can also request contextual metadata from the policy management server 140.

When the UD 110 sends a first DNS query 160a, due to the current context of the UD 110 the UD 110 receives (and may display) a block page 170 that explains that the requested network resource is blocked. In some embodiments, the block page 170 indicates the security policies that dictated why the first DNS query 160a was rejected. For example, the block page 170 may indicate that the requested network resource is not available to devices in a given location, at a given time, to a given device type, for users of a given software version, for various user classifications, etc., so that the user can change the context in which the DNS queries are sent to then receive the requested network resource. For example, a user 210 may move from a first location 220a to a second location 220b, wait from a first time 230a to a second time 230b, log in with a new account profile, change UDs 110, update software running on the current UD 110, etc., so that a second DNS query 160b for the same network resource returns access information 180 for the requested network resource based on the new context of the second DNS query 160b.

Figure 3:
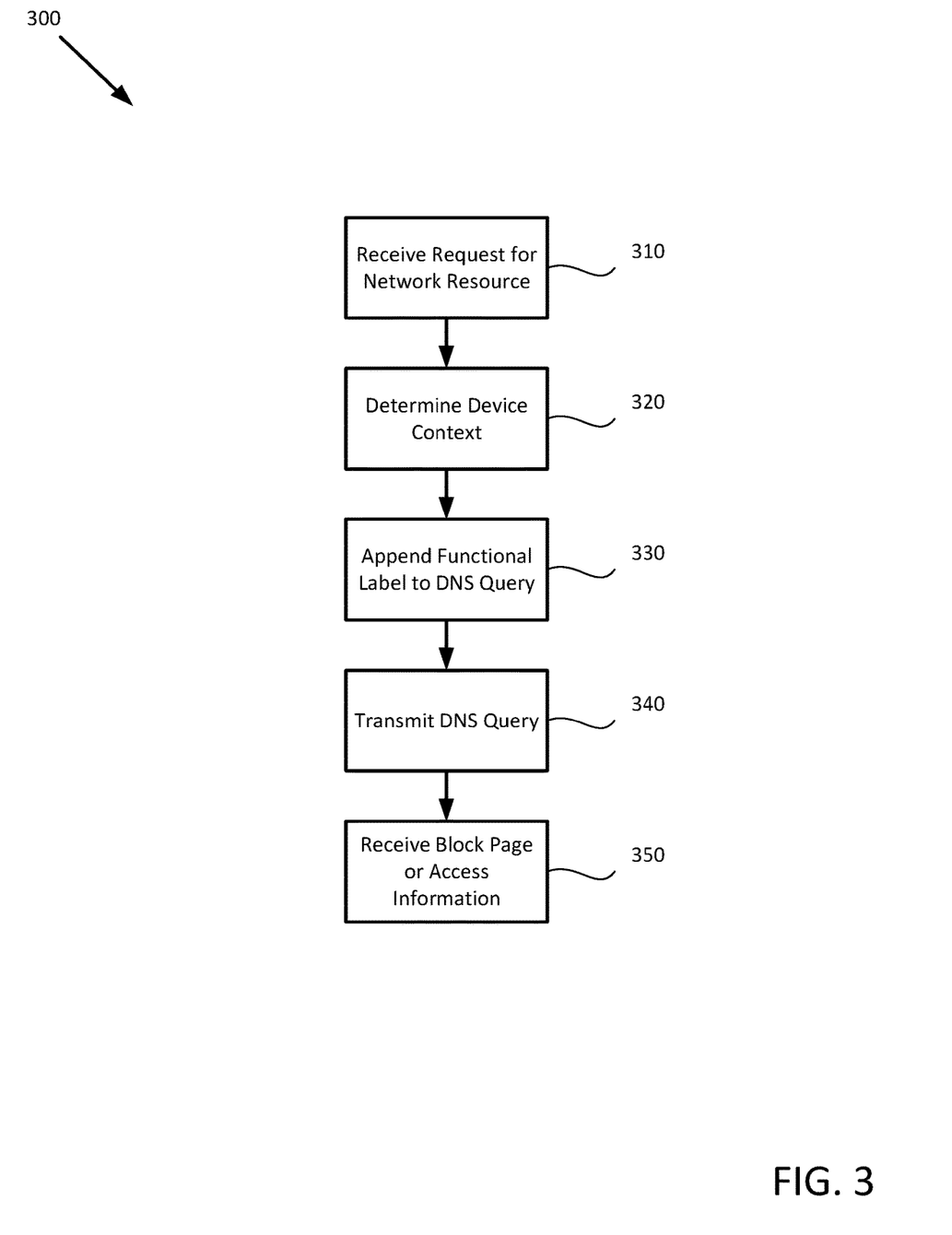
FIG. 3 is a flowchart of a method for providing device context in security policies, according to embodiments of the present disclosure.

FIG. 3 is a flowchart of a method 300 for providing device context in security policies, according to embodiments of the present disclosure. Method 300 begins with block 310 with a request for a network resource. In various embodiments, the request is received on the UD 110 from various applications executing on the UD 110 (e.g., web browsers, email clients, office productivity applications etc.) either automatically or by user command. To retrieve the requested network resource, the UD 110 may format the request into a DNS query to retrieve access information 180 for the requested network resource (e.g., an IP address for a web page). In various embodiments, the request is received as a DNS query from a UD 110 at a router 120.

At block 320, the UD 110 or router 120 determines device context to include with a DNS query for the requested network resource. In various embodiments, the context may include the context in which the UD 110 is requesting the network resource, which includes, but is not limited to: details of the account(s) logged into on the UD 110, version information for operating systems and other applications running on the UD 110, a device type of the UD 110, a location of the UD 110, and extrapolations thereof. In various embodiments, the context in which the router 120 receives the DNS query from the UD 110 includes, but is not limited to: a time of the request, a location of the UD 110 and/or the router 120, an access privilege level of the UD 110, a length of connection between the router 120 and the UD 110, a volume/frequency of communication between the router 120 and the UD 110, and extrapolations thereof.

At block 330, the UD 110 or router 120 appends functional labels for the device context to a DNS query. In various embodiments, the functional labels are included in the RDATA field of a DNS packet.

At block 340, the UD 110 transmits the DNS query including the functional labels to the router 120 or the router 120 transmits the DNS query including the functional labels to the DNS analysis server 130.

At block 350, the UD 110 or the router 120 receives the answer to the DNS query, which if the security policies grant access to the requested network resource includes the access information 180, or if the security policies deny access to the requested network resource includes a block page 170. When the router 120 receives the answer from the DNS analysis server 130, the router 120 forwards the answer to the UD 110. When the UD 110 receives the answer, the UD 110 may display the block page 170 to the user or may transmit a request for the network resource using the access information 180. Method 300 may then conclude.

Figure 4:
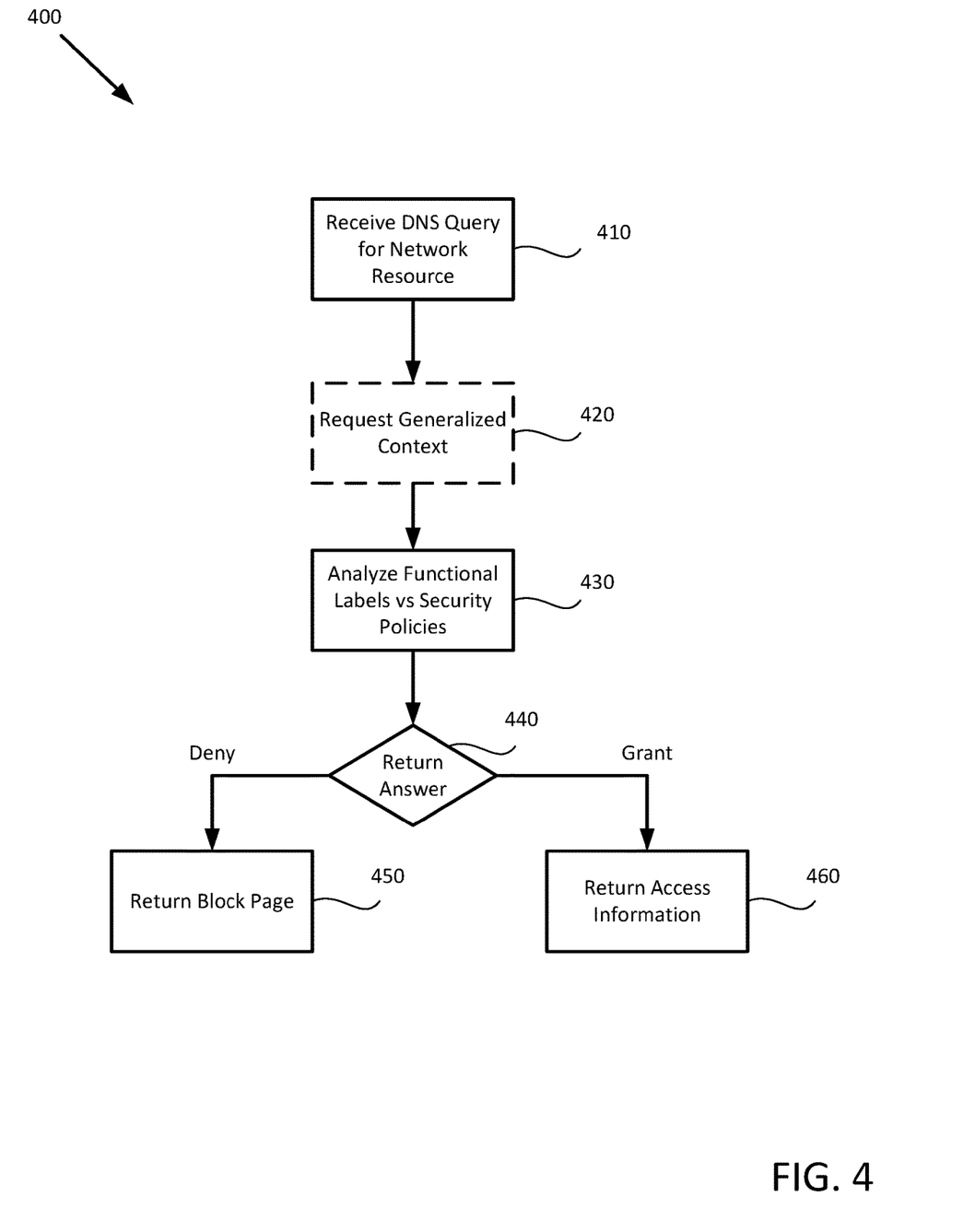
FIG. 4 is a flowchart of a method for providing device context in security policies, according to embodiments of the present disclosure.

FIG. 4 is a flowchart of a method 400 for providing device context in security policies, according to embodiments of the present disclosure. Method 400 begins with block 410, where a DNS analysis server 130 receives a DNS query for a network resource.

In various embodiments, the DNS query includes functional labels that provide extrapolated device context for the UD 110 (and/or the router 120) from which the DNS query was received. However, when the DNS query does not include functional labels (or does include functional labels, but not for a desired piece of metadata), the DNS analysis server 130 can request extrapolated context data for the DNS query from the policy management server 140 that are received out of band from the DNS queries at optional block 420.

At block 430, the DNS analysis server 130 analyzes the metadata included in the functional labels for the DNS query against the security policies for network access for the UD 110. In various embodiments, the security policies are received as part of a policy list 150 that defines a hierarchy of interaction between the various security policies that the DNS analysis server 130 applies to determine whether to grant or deny access to a given network resource based on the device context. At block 440, the DNS analysis server 130 determines how to answer the DNS query based on the applied security policies.

When the DNS analysis server 130 determines to deny access at block 440, method 400 proceeds to block 450, where the DNS analysis server 130 returns a block page 170 to the router 120 to forward to the UD 110. In various embodiments, the block page may indicate some or all of the policies that were responsible for denying access. Method 400 may then conclude.

When the DNS analysis server 130 determines to grant access at block 440, method 400 proceeds to block 460, where the DNS analysis server 130 returns the access information 180 (e.g., an IP address for the requested resource). In various embodiments, when returning the access information 180, DNS analysis server 130 queries various DNS servers to return the access information 180, which is then returned in the answer to the router 120 to forward to the UD 110. Method 400 may then conclude.

Figure 5:
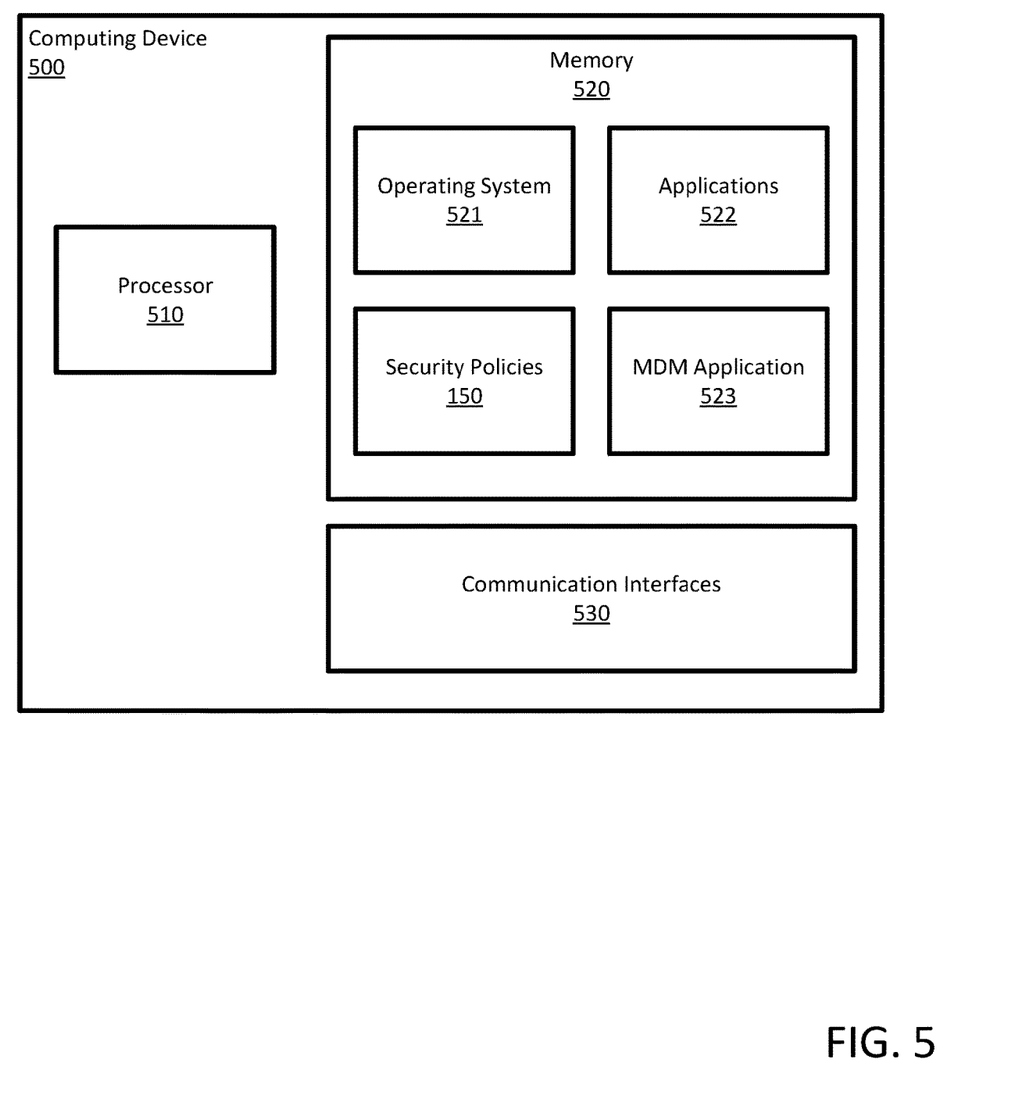
FIG. 5 illustrates hardware of a computing device, according to embodiments of the present disclosure.

FIG. 5 illustrates hardware of a computing device 500, as may be used in an UD 110, router 120, DNS analysis server 130, or policy management server 140 described in the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure. Additionally, the memory 520 includes one or more of the policy list 150 or an MDM application 523 to apply policies and/or functional labels to DNS queries for analysis according to the security policies included on the policy list 150.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving a Domain Name Service (DNS) query for a network resource from a user device at a DNS analysis server, the DNS query including a functional label describing a context of the user device;
analyzing, at the DNS analysis server, the DNS query to determine whether the user device is permitted to access the network resource based on the functional label; and
in response to the functional label indicating that the user device is not permitted to access the network resource, transmitting a block page to the user device;
wherein the DNS analysis server is configured to, in response to the functional label indicating that the user device is permitted to access the network resource, query a DNS server to obtain, for transmission to the user device, access information for the network resource.

2. The method of claim 1, wherein the functional label is added to the DNS query by a Mobile Device Management (MDM) application executing on the user device when the DNS query is transmitted from the user device, wherein the MDM application extrapolates the context based on metadata for the user device when generating the DNS query.

3. The method of claim 2, wherein the metadata as extrapolated describes at least one of:
a device type of the user device;
a location type where the user device is located;
an operating system or software application running on the user device; or
a user type of an account logged into the user device.

4. The method of claim 1, wherein the functional label is added to the DNS query by a router that receives the DNS query from the user device and forwards the DNS query including the functional label to the DNS analysis server.

5. The method of claim 1, wherein the functional label is added to the DNS query in response to the DNS analysis server requesting the functional label for the user device from an enterprise server associated with the user device.

6. The method of claim 1, further comprising:
aggregating, at a policy management server, the DNS query with previously denied requests that share at least one value in the functional label; and
identifying one or more user devices sharing the at least one value in the functional label as security-compromised devices.

7. The method of claim 1, further comprising:
wherein the block page indicates one or more security policies that cause access to the network resource to be denied based on the context.

8. A non-transitory computer readable storage device including instructions that when executed by a processor cause the processor to perform an operation comprising:
receiving a Domain Name Service (DNS) query for a network resource from a user device at a DNS analysis server, the DNS query including a functional label describing a context of the user device;
analyzing, at the DNS analysis server, the DNS query to determine whether the user device is permitted to access the network resource based on the functional label; and
in response to the functional label indicating that the user device is not permitted to access the network resource, transmitting a block page to the user device;
wherein the DNS analysis server is configured to, in response to the functional label indicating that the user device is permitted to access the network resource, query a DNS server to obtain, for transmission to the user device, access information for the network resource.

9. The non-transitory computer readable storage device of claim 8, wherein the functional label is added to the DNS query by a Mobile Device Management (MDM) application executing on the user device when the DNS query is transmitted from the user device, wherein the MDM application extrapolates the context based on metadata for the user device when generating the DNS query.

10. The non-transitory computer readable storage device of claim 9, wherein the metadata as extrapolated describes at least one of:
a device type of the user device;
a location type where the user device is located;
an operating system or software application running on the user device; or
a user type of an account logged into the user device.

11. The non-transitory computer readable storage device of claim 8, wherein the functional label is added to the DNS query by a router that receives the DNS query from the user device and forwards the DNS query including the functional label to the DNS analysis server.

12. The non-transitory computer readable storage device of claim 8, wherein the functional label is added to the DNS query in response to the DNS analysis server requesting the functional label for the user device from an enterprise server associated with the user device.

13. The non-transitory computer readable storage device of claim 8, wherein the operation further comprises:
aggregating, at a policy management server, the DNS query with previously denied requests that share at least one value in the functional label; and
identifying one or more user devices sharing the at least one value in the functional label as security-compromised devices.

14. The non-transitory computer readable storage device of claim 8, wherein the operation further comprises:
wherein the block page indicates one or more security policies that cause access to the network resource to be denied based on the context.

15. A method, comprising:
receiving, on a device, a request to access a network resource;
determining a context of the device based on metadata of the device;
appending, to a DNS query, a functional label that describes the context;
transmitting the DNS query with the appended functional label to a DNS analysis server; and
in response to a denial of the request, displaying a block page that indicates a security policy causing the denial;
wherein the device is configured to, in response to an approval of the request, access the network resource based on access information received from the DNS analysis server, which obtains the access information from a DNS server.

16. The method of claim 15, in which the functional label is added to the DNS query by a Mobile Device Management (MDM) application executing on the device when the DNS query is transmitted from the device, wherein the MDM application extrapolates the context based on the metadata for generating the DNS query by a user device.

17. The method of claim 16, wherein the metadata as extrapolated describes one of:
a device type of the user device;
a location type where the user device is located;
an operating system or software application running on the user device; or
a user type of an account logged into the user device.

18. The method of claim 16, wherein the DNS query is, at a policy management server, aggregated with previously denied requests that share at least one value in the functional label, and wherein one or more user devices sharing the at least one value in the functional label are identified as security-compromised devices.

19. The method of claim 15, wherein the functional label is added to the DNS query by a router that receives the DNS query from a user device and forwards the DNS query including the functional label to the DNS analysis server.

20. The method of claim 15, wherein the functional label is added to the DNS query in response to the DNS analysis server requesting the functional label for a user device from an enterprise server associated with the user device.

* * * * *